(12) United States Patent
Hsu et al.

(10) Patent No.: US 11,448,895 B2
(45) Date of Patent: Sep. 20, 2022

(54) OPTICAL ELEMENT DRIVING MECHANISM

(71) Applicant: TDK TAIWAN CORP., Taoyuan (TW)

(72) Inventors: Shang-Yu Hsu, Taoyuan (TW); Yu-Huai Liao, Taoyuan (TW); Shih-Wei Hung, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 280 days.

(21) Appl. No.: 16/900,220

(22) Filed: Jun. 12, 2020

(65) Prior Publication Data
US 2021/0063670 A1    Mar. 4, 2021

Related U.S. Application Data

(60) Provisional application No. 62/894,295, filed on Aug. 30, 2019.

(51) Int. Cl.
  *G02B 27/64* (2006.01)
  *G02B 7/04* (2021.01)
  (Continued)

(52) U.S. Cl.
  CPC .......... *G02B 27/646* (2013.01); *G01B 11/24* (2013.01); *G01S 7/4813* (2013.01); *G01S 7/4816* (2013.01);
  (Continued)

(58) Field of Classification Search
  CPC .. H02K 41/0356; H02K 11/01; H02K 11/215; H02K 2211/03; H02K 2201/18; H02K 5/24; H02K 5/2253; G02B 26/0816; G02B 26/101; G02B 26/105; G02B 27/646; G02B 7/1821; G02B 13/0065; G02B 7/005; G02B 7/04; G02B 7/08; G02B 7/4817; G02B 7/1805; G01S 7/4816; G01S 17/42; G01S 7/4813; G03B 5/06; G03B 5/00; G03B 5/04; G03B 30/00; G03B 3/10; G03B 2205/003; G03B 2205/007; G03B 2205/0069; G03B 2205/0046; G03B 17/17; G03B 13/36; G01B 11/24
  (Continued)

(56) References Cited

U.S. PATENT DOCUMENTS 10,795,114 B2 * 10/2020 Zhu .......................... G02B 7/02
10,859,890 B2 * 12/2020 Shin .................... H04N 5/23287
(Continued)

FOREIGN PATENT DOCUMENTS

CN        209858825 U    12/2019

OTHER PUBLICATIONS

Office Action issued in corresponding CN Application No. 202021089208.2 dated Nov. 13, 2020.

*Primary Examiner* — Pritham D Prabhakher
(74) *Attorney, Agent, or Firm* — Muncy, Geissler, Olds & Lowe, P.C.

(57) ABSTRACT

An optical element driving mechanism is provided that includes a fixed assembly, a movable assembly, and a driving assembly. The movable assembly is configured to be connected to an optical element, and the movable assembly is movable relative to the fixed assembly. The driving assembly is configured to drive the movable member to move relative to the fixed assembly.

14 Claims, 10 Drawing Sheets

(51) Int. Cl.

| | | |
|---|---|---|
| *H02K 41/035* | (2006.01) | |
| *G03B 5/06* | (2021.01) | |
| *G03B 5/00* | (2021.01) | |
| *G02B 7/182* | (2021.01) | |
| *G02B 7/00* | (2021.01) | |
| *G01B 11/24* | (2006.01) | |
| *G01S 7/481* | (2006.01) | |
| *G01S 17/42* | (2006.01) | |
| *G02B 26/08* | (2006.01) | |
| *G02B 26/10* | (2006.01) | |
| *G03B 3/10* | (2021.01) | |
| *H02K 11/01* | (2016.01) | |
| *G03B 13/36* | (2021.01) | |
| *H02K 5/24* | (2006.01) | |
| *G02B 7/18* | (2021.01) | |
| *G03B 17/17* | (2021.01) | |
| *G03B 5/04* | (2021.01) | |
| *H04N 5/225* | (2006.01) | |

(52) U.S. Cl.
CPC ............ *G01S 7/4817* (2013.01); *G01S 17/42* (2013.01); *G02B 7/005* (2013.01); *G02B 7/04* (2013.01); *G02B 7/1821* (2013.01); *G02B 26/0816* (2013.01); *G02B 26/101* (2013.01); *G02B 26/105* (2013.01); *G03B 5/00* (2013.01); *G03B 5/06* (2013.01); *H02K 41/0356* (2013.01); *G02B 7/1805* (2013.01); *G03B 3/10* (2013.01); *G03B 5/04* (2013.01); *G03B 13/36* (2013.01); *G03B 17/17* (2013.01); *G03B 2205/0007* (2013.01); *G03B 2205/0046* (2013.01); *G03B 2205/0069* (2013.01); *H02K 5/24* (2013.01); *H02K 11/01* (2016.01); *H02K 2201/18* (2013.01); *H04N 5/2253* (2013.01)

(58) Field of Classification Search
USPC .......................................................... 359/822
See application file for complete search history.

(56) References Cited

U.S. PATENT DOCUMENTS

| | | | |
|---|---|---|---|
| 2019/0004279 A1* | 1/2019 | Park | ........................ G02B 7/08 |
| 2019/0011723 A1* | 1/2019 | Park | .................... H04N 5/2254 |
| 2019/0107685 A1* | 4/2019 | Kim | ........................ G02B 7/10 |
| 2019/0302398 A1* | 10/2019 | Zhu | ...................... G02B 7/026 |
| 2019/0324225 A1* | 10/2019 | Wu | ........................ G02B 7/08 |
| 2020/0012068 A1* | 1/2020 | Lim | ..................... G03B 17/02 |
| 2020/0033553 A1* | 1/2020 | Huang | .................... G03B 3/10 |
| 2020/0033558 A1* | 1/2020 | Huang | ................ H04N 5/2328 |
| 2020/0036301 A1* | 1/2020 | Wu | ..................... H04N 5/2253 |
| 2020/0041756 A1* | 2/2020 | Kao | ........................ G02B 7/08 |
| 2021/0006720 A1* | 1/2021 | Enta | ........................ G03B 5/00 |

* cited by examiner

OPTICAL ELEMENT DRIVING MECHANISM

CROSS REFERENCE TO RELATED APPLICATIONS

This application claims the benefit of U.S. Provisional Application No. 62/894,295, filed Aug. 30, 2019, the entirety of which is incorporated by reference herein.

BACKGROUND OF THE DISCLOSURE

Field of the Disclosure

The present disclosure relates to an optical element driving mechanism, and in particular it relates to an optical element driving mechanism having curved pins.

Description of the Related Art

The rapid development of technology means that many of today's electronic devices (such as smartphones) have camera or video functionality. Using the camera modules disposed in electronic devices, users can operate their electronic devices to capture photographs and record video.

Today's designs for electronic devices continue to follow the trend of miniaturization, meaning that the various components of a camera module and its structure must be continuously reduced in size, so as to achieve miniaturization. In general, a driving mechanism in a camera module has a camera lens holder that is configured to hold a camera lens, and the driving mechanism can have the functions of auto focusing or optical image stabilization. However, although the existing driving mechanism can achieve the aforementioned functions of photographing and video recording, they still cannot meet all the needs of the users.

Therefore, how to design a camera module that can perform autofocus, optical image stabilization and achieve miniaturization is a topic nowadays that needs to be discussed and solved.

BRIEF SUMMARY OF THE DISCLOSURE

Accordingly, one objective of the present disclosure is to provide an optical element driving mechanism to solve the above problems.

According to some embodiments of the disclosure, an optical element driving mechanism is provided and includes a fixed assembly, a movable assembly, and a driving assembly. The fixed assembly has a main axis. The movable assembly is configured to be connected to an optical element, and the movable assembly is movable relative to the fixed assembly. The driving assembly is configured to drive the movable member to move relative to the fixed assembly.

According to some embodiments, the fixed assembly further includes a base, the optical element driving mechanism further includes a circuit member disposed inside the base, an electrical connection terminal of the circuit member protrudes from the base, the electrical connection terminal includes a straight portion and a bent portion, and when viewed in a direction perpendicular to the main axis, the straight portion is closer to a light-incident end of the optical element driving mechanism than the bent portion.

According to some embodiments, the straight portion has a first surface and a second surface, the first surface is parallel to the main axis, the second surface is perpendicular to the main axis, and the first surface is made of a different material than the second surface.

According to some embodiments, the optical element driving mechanism further includes a circuit assembly, the circuit assembly includes an electrical connection portion, and the electrical connection portion is configured to be electrically connected to the straight portion and/or the bent portion.

According to some embodiments, when viewed along the main axis, the electrical connection portion overlaps at least one portion of the second surface of the straight portion.

According to some embodiments, the straight portion further has a third surface and a fourth surface, when viewed along a direction perpendicular to the main axis, both the third surface and the fourth surface are parallel to the main axis, and the third surface and the fourth surface both correspond to the electrical connection portion.

According to some embodiments, the straight portion further has a third surface and a fourth surface, when viewed along a direction perpendicular to the main axis, both the third surface and the fourth surface are parallel to the main axis, and only one of the third surface or the fourth surface corresponds to the electrical connection portion.

According to some embodiments, the optical element driving mechanism further includes an adhesive assembly disposed between the bent portion and the electrical connection portion.

According to some embodiments, the circuit member further includes an external electrical connection portion configured to be electrically connected to an external circuit, and the external electrical connection portion and the electrical connection terminal extend in opposite directions, wherein when viewed along the main axis, the optical element driving mechanism has a rectangular structure, and the electrical connection terminal and the external electrical connection portion are located on different sides of the optical element driving mechanism.

According to some embodiments, the driving assembly includes a driving magnetic element configured to drive the movable assembly to move, and when viewed along the main axis, the driving magnetic element and the external electrical connection portion are located on a same side of the optical element driving mechanism.

According to some embodiments, the fixed assembly further includes a base. The optical element driving mechanism further includes a circuit member disposed inside the base. The electrical connection terminal of the circuit member protrudes from the base. The electrical connection terminal includes a straight portion and a bent portion. When viewed in a direction perpendicular to the main axis, the straight portion is closer to a light-exiting end of the optical element driving mechanism than the bent portion.

According to some embodiments, the movable assembly has a first convex portion and a second convex portion. The first convex portion extends in a direction that is perpendicular to the main axis. The second convex portion extends along the main axis. The first convex surface of the first convex portion faces a second convex surface of the second convex portion. At least one portion of a driving coil of the driving assembly is disposed between the first convex surface and the second convex surface.

According to some embodiments, the optical element driving mechanism further includes an elastic element. The fixed assembly includes a base. The elastic element is elastically connected to the movable assembly and the fixed assembly. The movable assembly includes a recess formed facing the base. When viewed along the main axis, the elastic element partially overlaps the recess.

According to some embodiments, the fixed assembly further includes a casing, which has a top wall that is perpendicular to the main axis. When viewed along the main axis, the top wall completely overlaps the recess.

The present disclosure provides an optical element driving mechanism having a circuit assembly and the circuit member, and the circuit member has a plurality of electrical connection terminals, corresponding to the plurality of electrical connection portions of the circuit assembly. The electrical connection terminal protrudes from the base. The electrical connection terminal may include a straight portion and a bent portion, and the straight portion extends in the optical axis from the bent portion.

Furthermore, the electrical connection terminal is electrically connected to the electrical connection portion by the solder. Based on the design of the circuit member of the present disclosure, the contact area between the solder and the electrical connection terminal can be increased, thereby increasing the structural strength between the circuit member and circuit assembly.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean+/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 1:
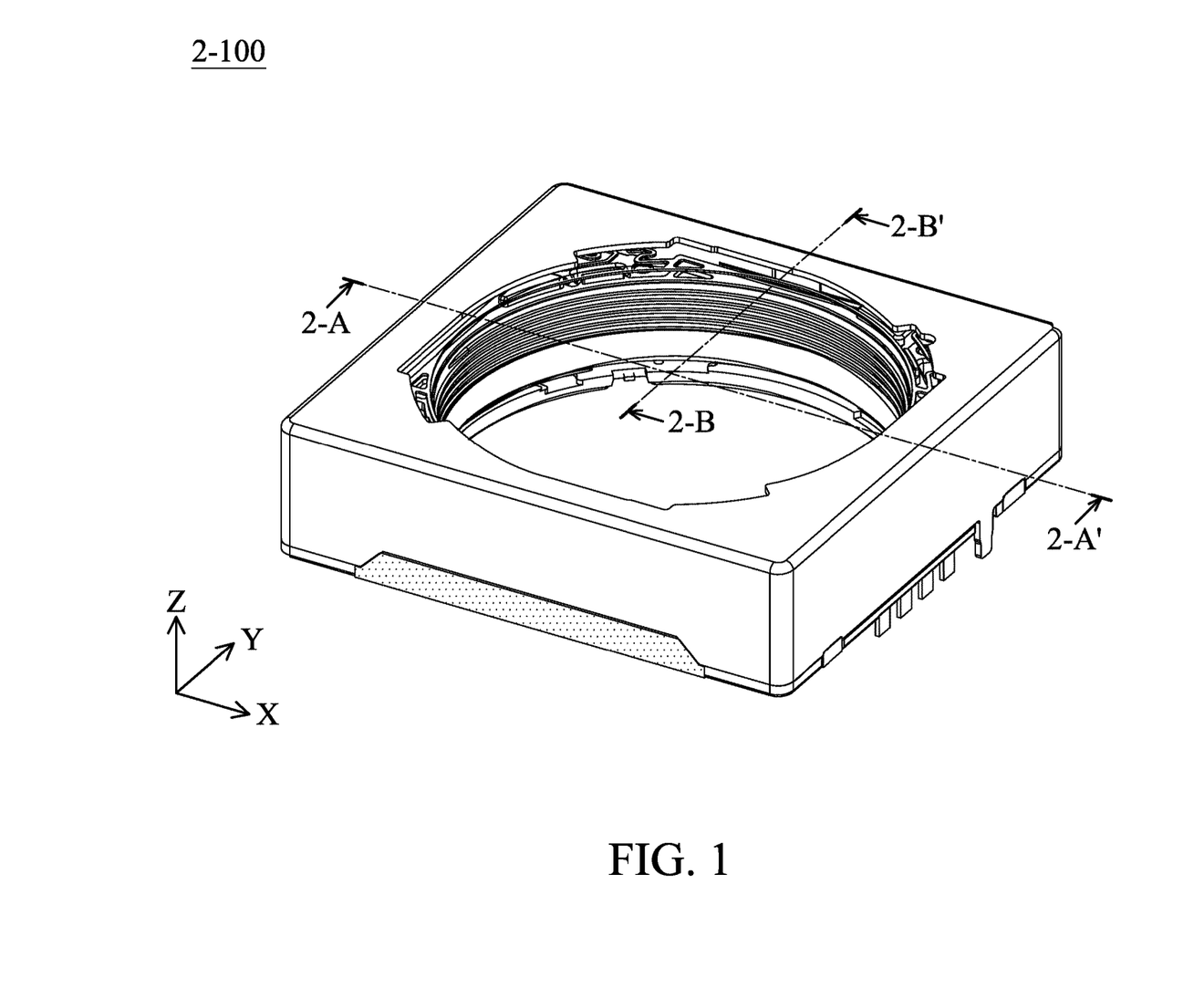
FIG. 1 is a schematic diagram of an optical element driving mechanism 2-100 according to an embodiment of the present disclosure.
Figure 2:
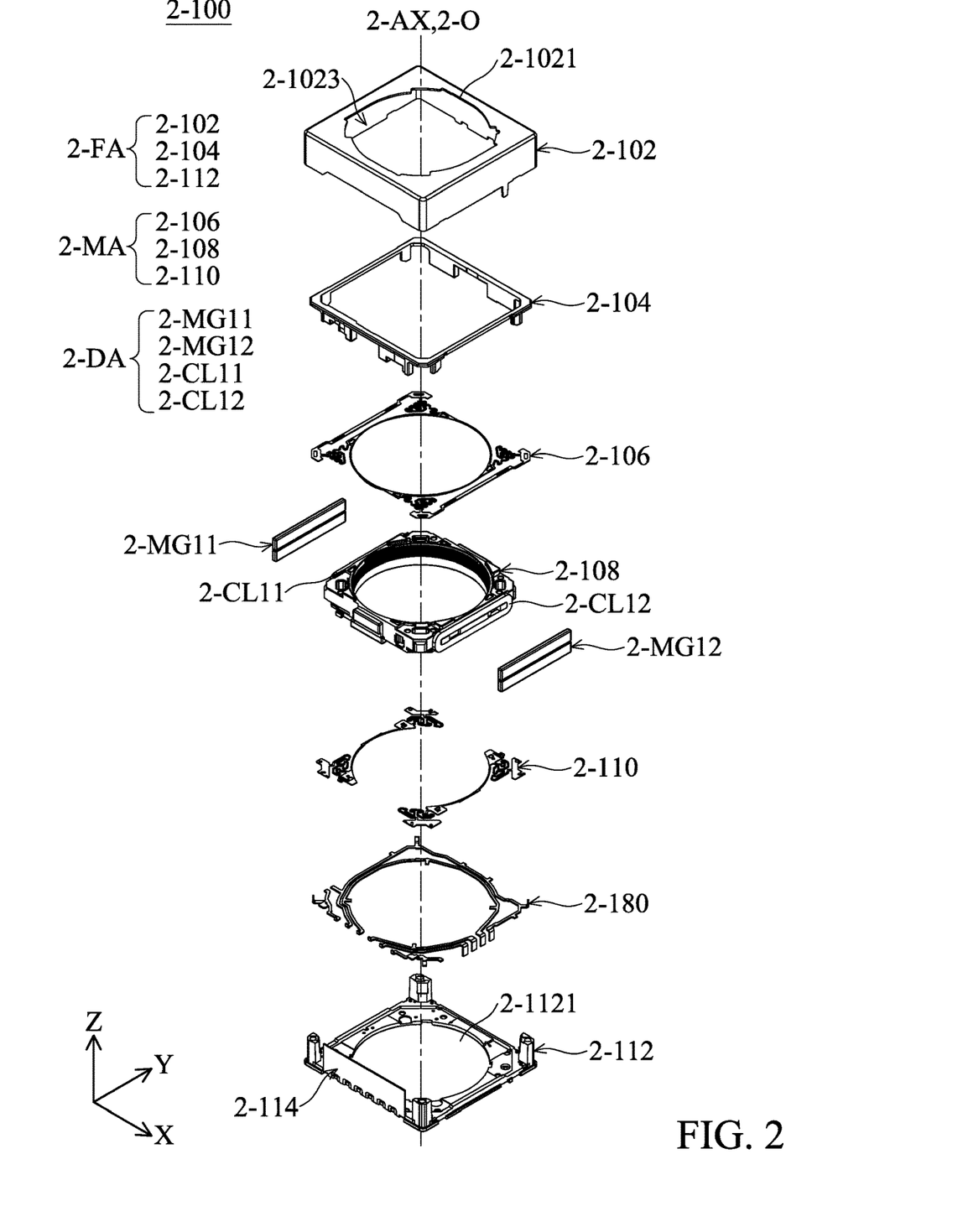
FIG. 2 is an exploded diagram of the optical element driving mechanism 2-100 according to an embodiment of the present disclosure.
Figure 3:
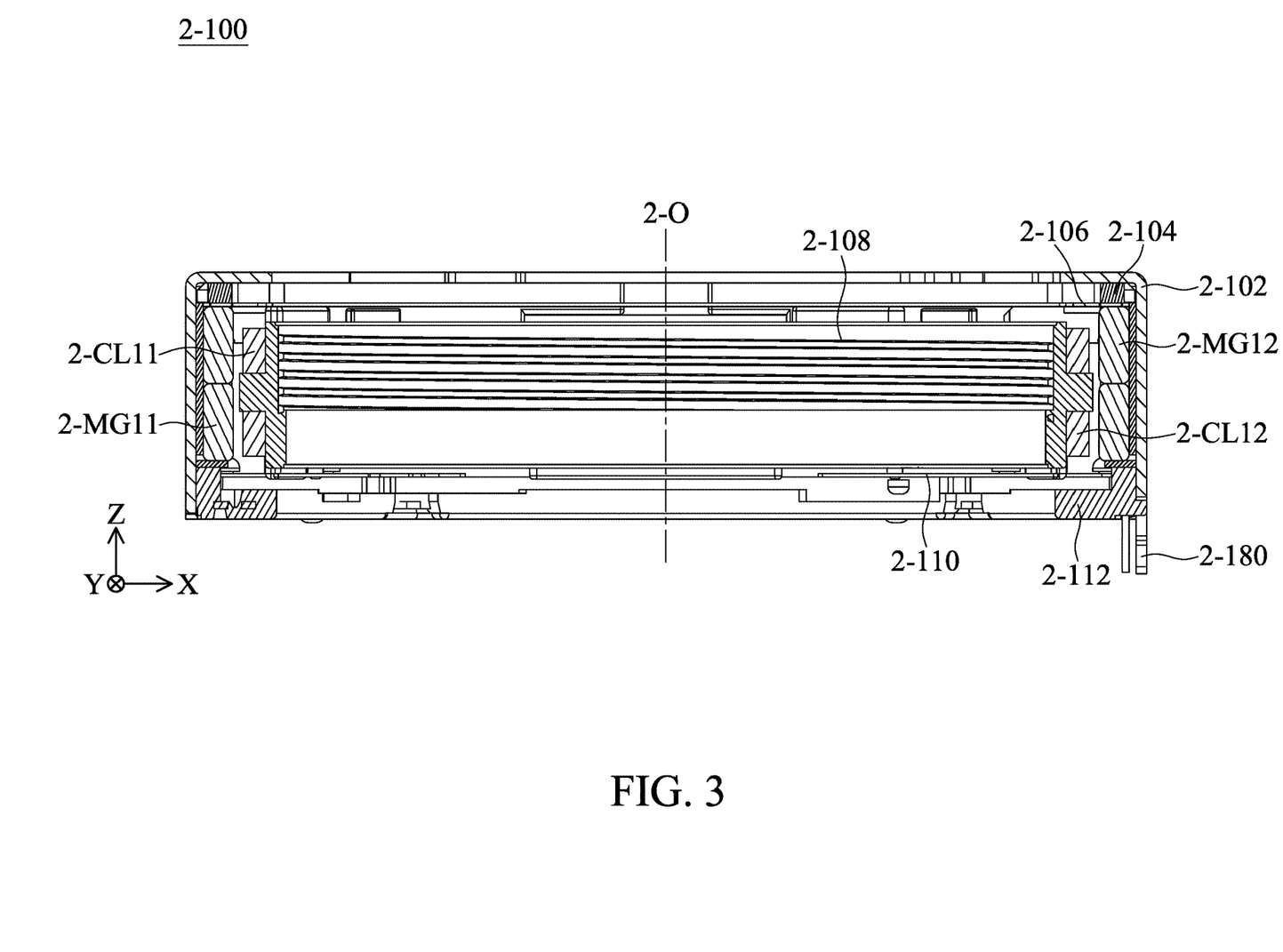
FIG. 3 is a cross-sectional view of the optical element driving mechanism 2-100 along line 2-A-2-A' in FIG. 3 according to an embodiment of the present disclosure.

Please refer to FIG. 1 to FIG. 3. FIG. 1 is a schematic diagram of an optical element driving mechanism 2-100 according to an embodiment of the present disclosure. FIG. 2 is an exploded diagram of the optical element driving mechanism 2-100 according to an embodiment of the present disclosure, and FIG. 3 is a cross-sectional view of the optical element driving mechanism 2-100 along line 2-A-2-A' in FIG. 3 according to an embodiment of the present disclosure. The optical element driving mechanism 2-100 can be an optical camera module configured to hold an optical element. The optical element driving mechanism 2-100 can be installed in various electronic devices or portable electronic devices, such as a smartphone, for allowing a user to perform the image capturing function. In this embodiment, the optical element driving mechanism 2-100 can be a voice coil motor (VCM) with an auto-focusing (AF) function, but it is not limited thereto. In other embodiments, the optical element driving mechanism 2-100 can also perform the functions of auto-focusing and optical image stabilization (OIS).

In the present embodiment, the optical element driving mechanism 2-100 can include a fixed assembly 2-FA, a movable assembly 2-MA, and a driving assembly 2-DA. The movable assembly 2-MA is movably connected to the fixed assembly 2-FA, and the movable assembly 2-MA is configured to hold the optical element (not shown in the figures). The driving assembly 2-DA is configured to drive the movable assembly 2-MA to move relative to the fixed assembly 2-FA.

In this embodiment, as shown in FIG. 2, the fixed assembly 2-FA includes a casing 2-102, a frame 2-104 and a base 2-112. The movable assembly 2-MA includes a lens holder 2-108 and the aforementioned optical element, and the lens holder 2-108 is used for holding the optical element. A main axis 2-AX can be defined by the fixed assembly 2-FA, and an optical axis 2-O can be defined by the optical element. The main axis 2-AX may, for example, overlap the optical axis 2-O, but it is not limited thereto.

As shown in FIG. 2, the casing 2-102 has a hollow structure, and a casing opening 2-1021 is formed thereon, and a base opening 2-1121 is formed on the base 2-112. The center of the casing opening 2-1021 corresponds to the optical axis 2-O of the optical element, and the base opening 2-1121 corresponds to a photosensitive element (not shown) disposed under the base 2-112. The external light can enter the casing 2-102 from the casing opening 2-1021 to be received by the photosensitive element after passing through the optical element and the base opening 2-1121 so as to generate a digital image signal. In this embodiment, a light-incident end and a light-exiting end may be defined by the optical element driving mechanism 2-100, and the light-incident end may be a light emitting source above the optical element driving mechanism 2-100 in FIG. 3, and the light-exiting end may be a light receiving end under the optical element driving mechanism 2-100 in FIG. 3.

Furthermore, the casing 2-102 is disposed on the base 2-112 and may have an accommodating space 2-1023 for accommodating the movable assembly 2-MA (including the aforementioned optical element and the lens holder 2-108) and the driving assembly 2-DA. The frame 2-104 is fixed to the casing 2-102 and disposed in the accommodating space 2-1023.

The movable assembly 2-MA may further include a first elastic member 2-106 and a second elastic member 2-110. The outer portion (the outer ring portion) of the first elastic member 2-106 is fixed to the frame 2-104, the outer portion (the outer ring portion) of the second elastic member 2-110 is fixed to the base 2-112, and the inner portions (the inner ring portions) of the first elastic member 2-106 and the second elastic member 2-110 are respectively connected to the upper and lower sides of the lens holder 2-108, so that the lens holder 2-108 can be suspended in the accommodating space 2-1023. That is, the elastic elements are elastically connected to the movable assembly 2-MA and the fixed assembly 2-FA.

In this embodiment, the driving assembly 2-DA may include a first magnet 2-MG11, a second magnet 2-MG12, a first coil 2-CL11, and a second coil 2-CL12. The first coil 2-CL11 and the second coil 2-CL12 are disposed on the lens holder 2-108, and the first magnet 2-MG11 and the second magnet 2-MG12 are disposed on the inner wall surface of the casing 2-102 respectively corresponding to the first coil 2-CL11 and the second coil 2-CL12.

In this embodiment, the first coil 2-CL11 and the second coil 2-CL12 may be wound coils (oval coils) and be disposed on opposite sides of the lens holder 2-108. When the first coil 2-CL11 and the second coil 2-CL12 are provided with electricity, the first coil 2-CL11 and the second coil 2-CL12 respectively act with the first magnet 2-MG11 and the second magnet 2-MG12 to generate an electromagnetic force, so as to drive the lens holder 2-108 and the held optical element to move relative to the base 2-112 along the optical axis 2-O (the Z-axis).

Furthermore, the optical element driving mechanism 2-100 of the present disclosure further includes a circuit assembly 2-114 and the circuit member 2-180 configured to be electrically connected to the driving assembly 2-DA. The circuit assembly 2-114 may be a circuit board configured to be electrically connected to an external circuit, such as a main circuit board of an external electronic device, so that the driving assembly 2-DA can operate according to the signal of the external electronic device.

Furthermore, in this embodiment, the circuit member 2-180 is disposed inside the base 2-112. For example, the base 2-112 is made of plastic material, and the circuit member 2-180 is formed in the base 2-112 by the molded interconnect device (MID) technology.

Figure 4:
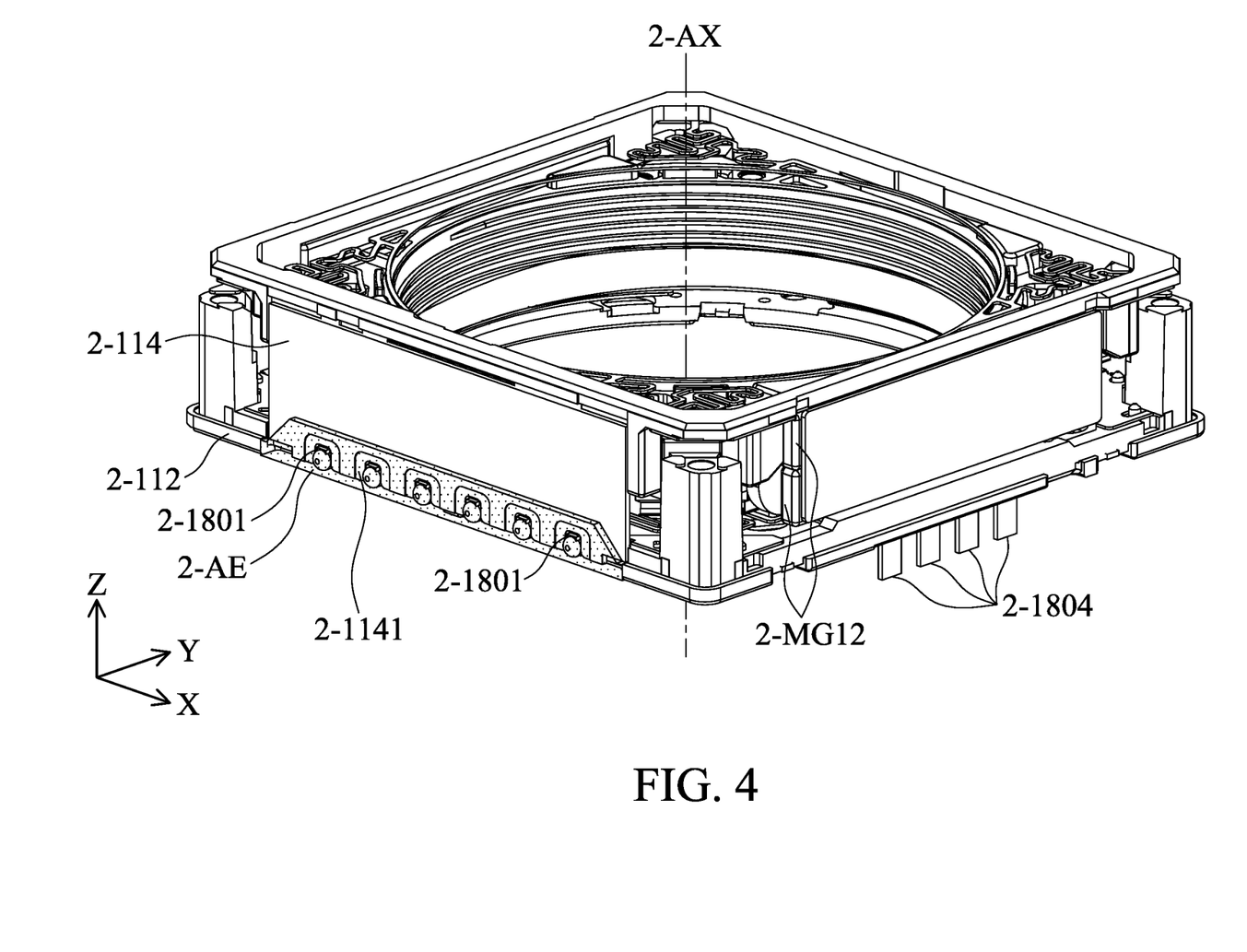
FIG. 4 is a perspective view of the optical element driving mechanism 2-100 after removing the casing 2-102 according to an embodiment of the present disclosure.
Figure 5:
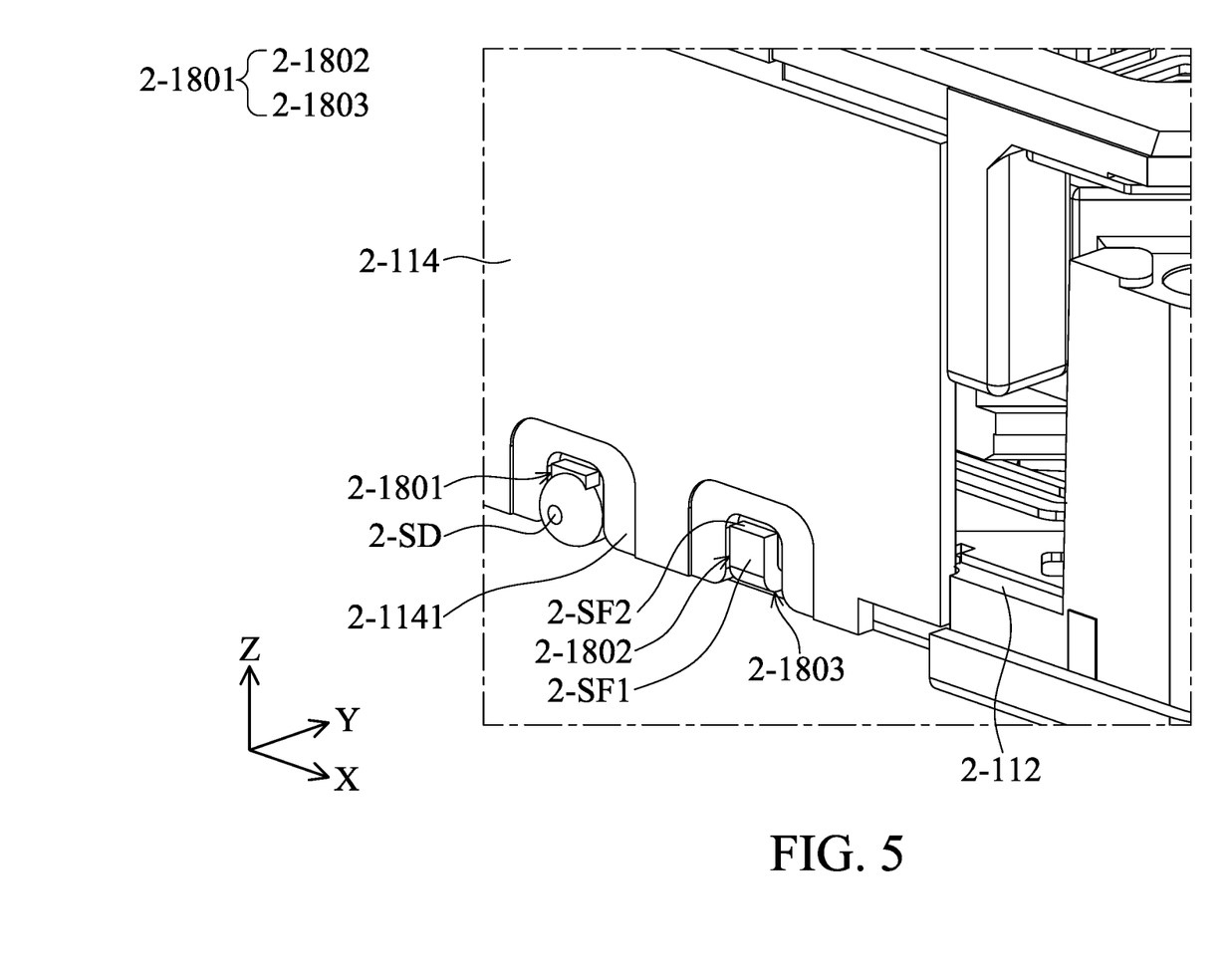
FIG. 5 is a partial enlarged diagram of the optical element driving mechanism 2-100 according to an embodiment of the present disclosure.

Please refer to FIG. 4 to FIG. 5. FIG. 4 is a perspective view of the optical element driving mechanism 2-100 after removing the casing 2-102 according to an embodiment of the present disclosure, and FIG. 5 is a partial enlarged diagram of the optical element driving mechanism 2-100 according to an embodiment of the present disclosure. In this embodiment, the circuit member 2-180 has a plurality of electrical connection terminals 2-1801, protruding from the base 2-112, and each of the electrical connection terminals 2-1801 may include a straight portion 2-1802 and a bent portion 2-1803.

When viewed in a direction perpendicular to the main axis 2-AX (for example, in the Y-axis), the straight portion 2-1802 is closer to the light-incident end of the optical element driving mechanism 2-100 than the bent portion 2-1803. Specifically, the straight portion 2-1802 extends in the +Z-axis from the bent portion 2-1803, and the straight portion 2-1802 may be parallel to the optical axis 2-O, for example, but it is not limited thereto.

In other embodiments of the present disclosure, the straight portion 2-1802 extends in the −Z-axis from the bent portion 2-1803. Therefore, when viewed in the direction perpendicular to the main axis 2-AX (the Y-axis), the straight portion 2-1802 is closer to the light-exiting end of the optical element driving mechanism 2-100 than the bent portion 2-1803.

As shown in FIG. 5, the straight portion 2-1802 has a first surface 2-SF1 parallel to the main axis 2-AX and a second surface 2-SF2 perpendicular to the main axis 2-AX, and the first surface 2-SF1 is made of a different material than the second surface 2-SF2.

As shown in FIG. 5, the circuit assembly 2-114 may include a plurality of electrical connection portions 2-1141, the electrical connection portion 2-1141 is configured to be electrically connected to the corresponding straight portion 2-1802 and/or the bent portion 2-1803. The electrical connection portion 2-1141 can be a solder pad configured to be connected to the corresponding electrical connection terminal 2-1801 by solder 2-SD.

In this embodiment, the electrical connection terminals 2-1801 protrude from the circuit assembly 2-114, and when viewed along the main axis 2-AX, the electrical connection portion 2-1141 overlaps at least one portion of the second surface 2-SF2 of the corresponding straight portion 2-1802.

As shown in FIG. 4, the optical element driving mechanism 2-100 may further include an adhesive element 2-AE, and the adhesive element 2-AE may be glue, which is disposed between the bent portion 2-1803 and the electrical connection portion 2-1141. The adhesive element 2-AE can completely cover and protect the electrical connection terminals 2-1801 and the electrical connection portions 2-1141. The adhesive element 2-AE and the solder 2-SD may be collectively referred to as an adhesive assembly.

Furthermore, as shown in FIG. 4, the circuit member 2-180 may further include a plurality of external electrical connection portions 2-1804 configured to be electrically connected to an external circuit, and the external electrical connection portions 2-1804 and the electrical connection terminals 2-1801 extend in opposite directions. Specifically, the external electrical connection portion 2-1804 extends in the −Z-axis, and the electrical connection terminal 2-1801 extends in the +Z-axis.

As shown in FIG. 1 and FIG. 4, when viewed along the main axis 2-AX, the optical element driving mechanism 2-100 has a rectangular structure, and the electrical connection terminals 2-1801 and the external electrical connection portions 2-1804 are located on different sides of the optical element driving mechanism 2-100.

In this embodiment, the first magnet 2-MG11 and the second magnet 2-MG12 may be referred to as driving magnetic elements, and when viewed along the main axis 2-AX, the second magnet 2-MG12 and the external electrical connection portions 2-1804 are located on the same side of the optical element driving mechanism 2-100.

Figure 6:
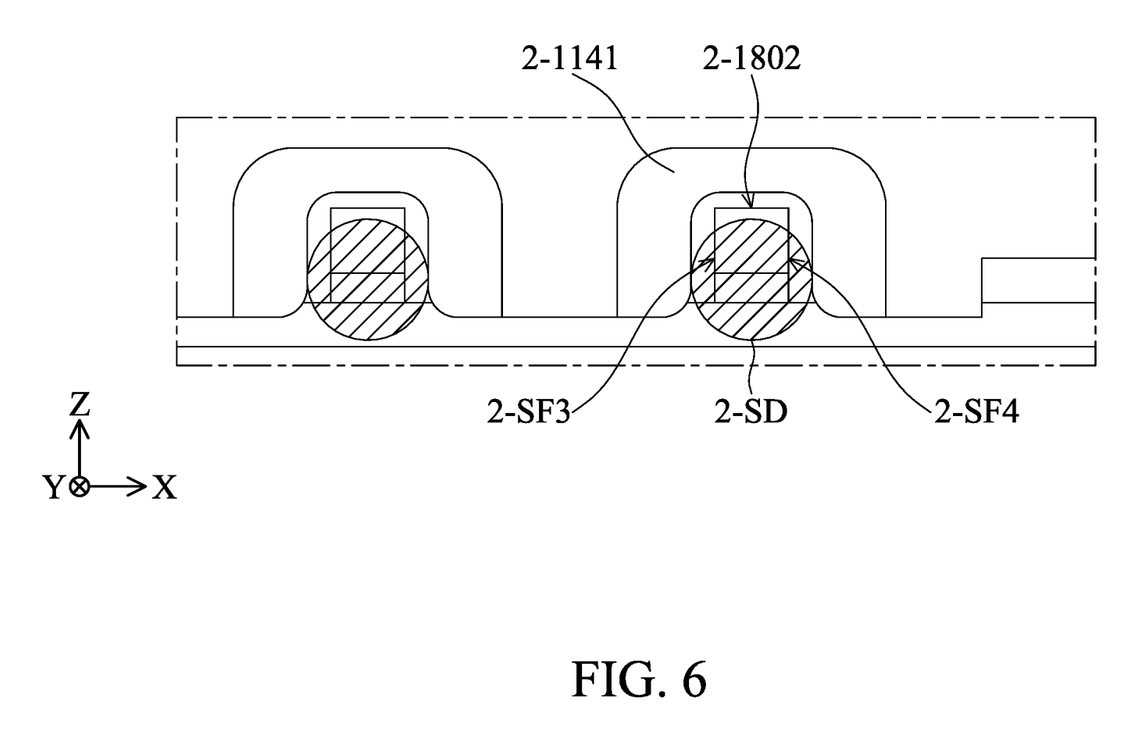
FIG. 6 is a partial structural diagram of the optical element driving mechanism 2-100 according to an embodiment of the present disclosure.

Please refer to FIG. 6, which is a partial structural diagram of the optical element driving mechanism 2-100 according to an embodiment of the present disclosure. When viewed along a direction (such as the Y-axis) perpendicular to the main axis 2-AX, the straight portion 2-1802 further has a third surface 2-SF3 and a fourth surface 2-SF4, and both the third surface 2-SF3 and the fourth surface 2-SF4 are parallel to the main axis 2-AX (the Z-axis). The electrical connection portion 2-1141 may have a U-shaped structure, and the third surface 2-SF3 and the fourth surface 2-SF4 both correspond to the electrical connection portion 2-1141.

Figure 7:
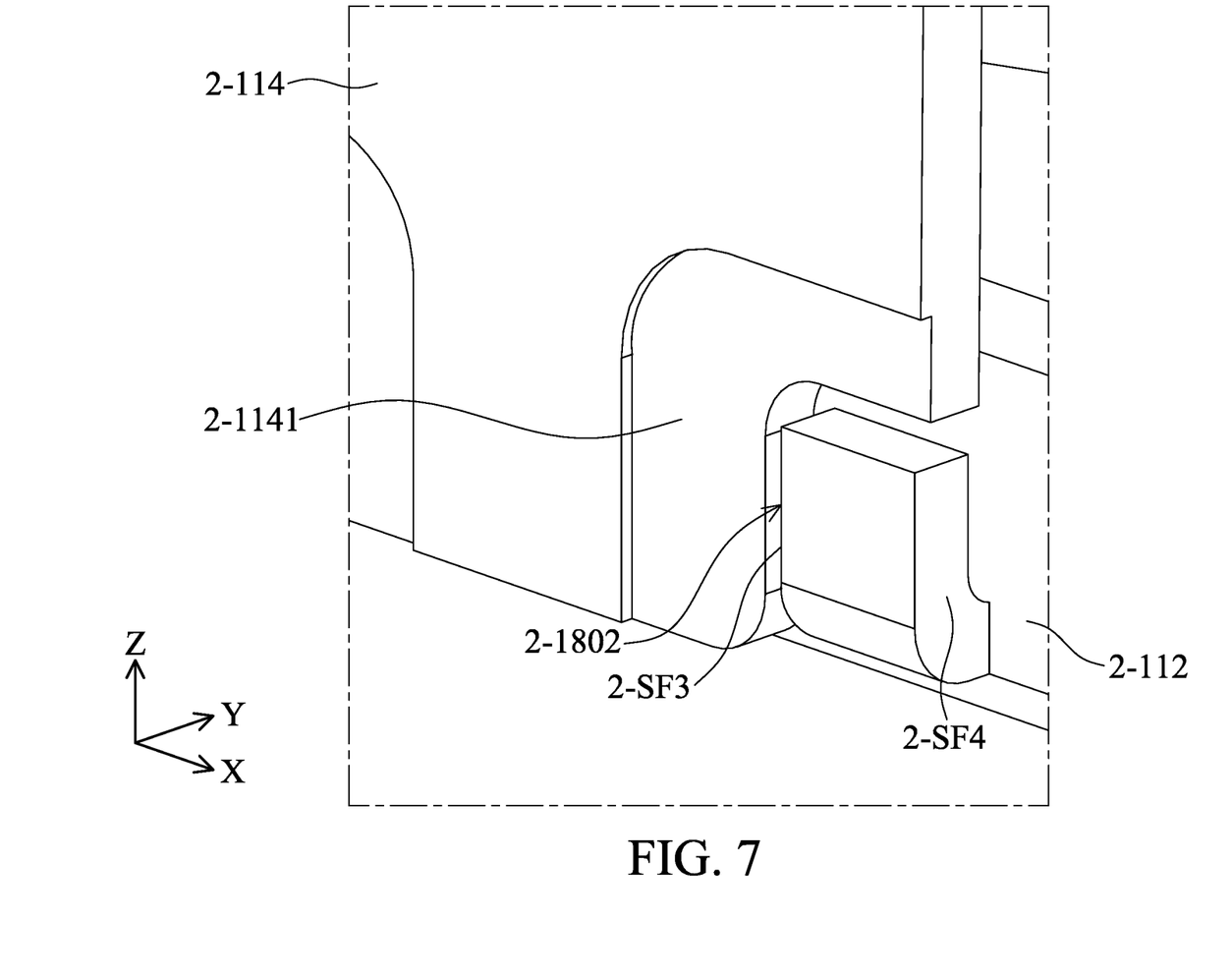
FIG. 7 is a partial structural diagram of the optical element driving mechanism 2-100 according to an embodiment of the present disclosure.

Please refer to FIG. 7, which is a partial structural diagram of the optical element driving mechanism 2-100 according to an embodiment of the present disclosure. In this embodiment, when viewed in a direction perpendicular to the main axis 2-AX (for example, the Y-axis), the electrical connection portion 2-1141 may have an L-shape structure, and only one of the third surface 2-SF3 or the fourth surface 2-SF4 corresponds to the electrical connection portion 2-1141.

Figure 8:
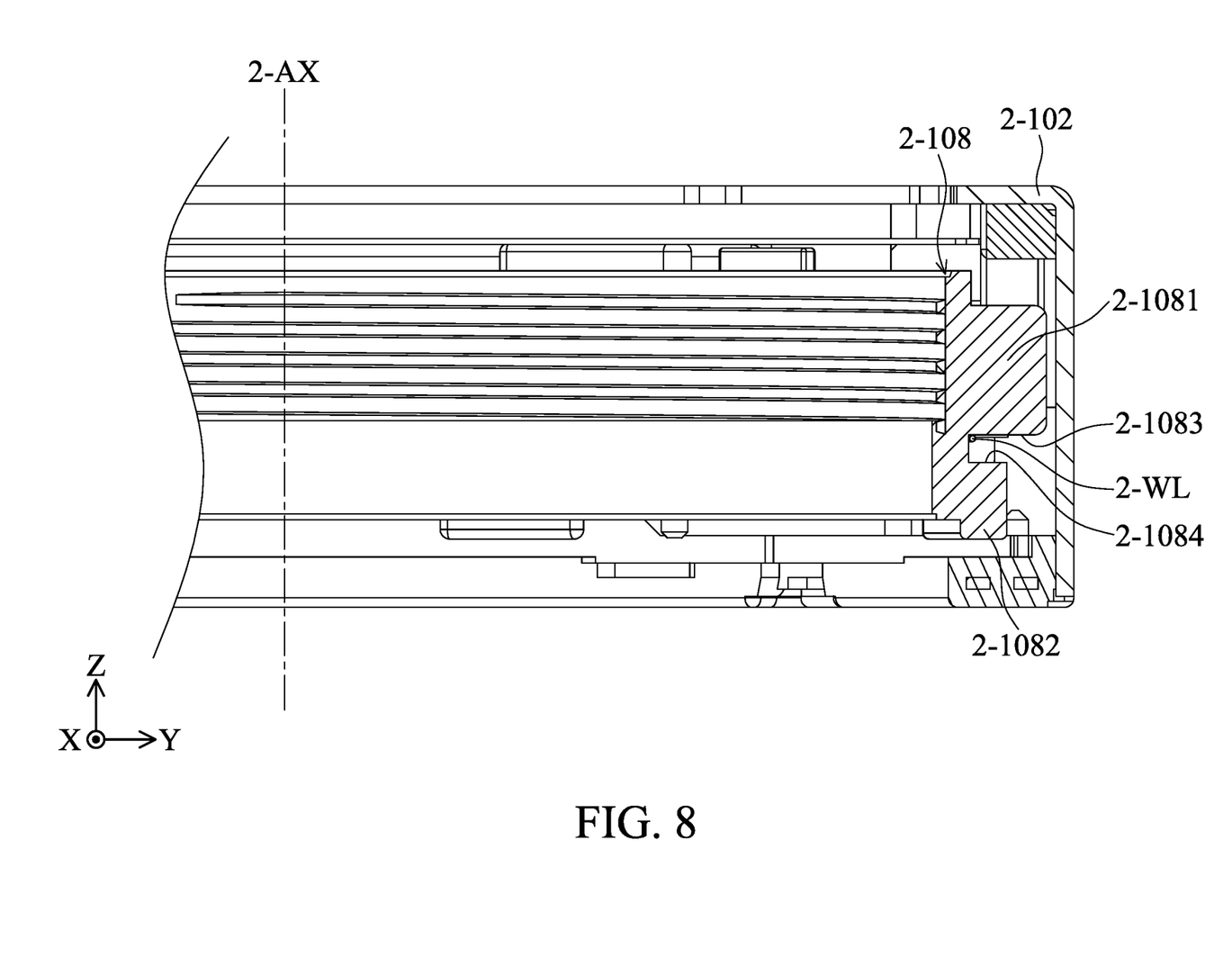
FIG. 8 is a cross-sectional view of the optical element driving mechanism 2-100 along the line 2-B-2-B' in FIG. 1 according to an embodiment of the present disclosure.

Please refer to FIG. 8, which is a cross-sectional view of the optical element driving mechanism 2-100 along the line 2-B-2-B' in FIG. 1 according to an embodiment of the present disclosure. In this embodiment, the lens holder 2-108 has a first convex portion 2-1081 and a second convex portion 2-1082, the first convex portion 2-1081 extends in a direction perpendicular to the main axis 2-AX (such as the Y-axis), the second convex portion 2-1082 extends along the main axis 2-AX, and a first convex surface 2-1083 of the first convex portion 2-1081 faces a second convex surface 2-1084 of the second convex portion 2-1082.

In addition, the first coil 2-CL11 (or the second coil 2-CL12) is formed by a wire 2-WL, and at least a part of the wire 2-WL is disposed between the first convex surface 2-1083 and the second convex surface 2-1084.

Figure 9:
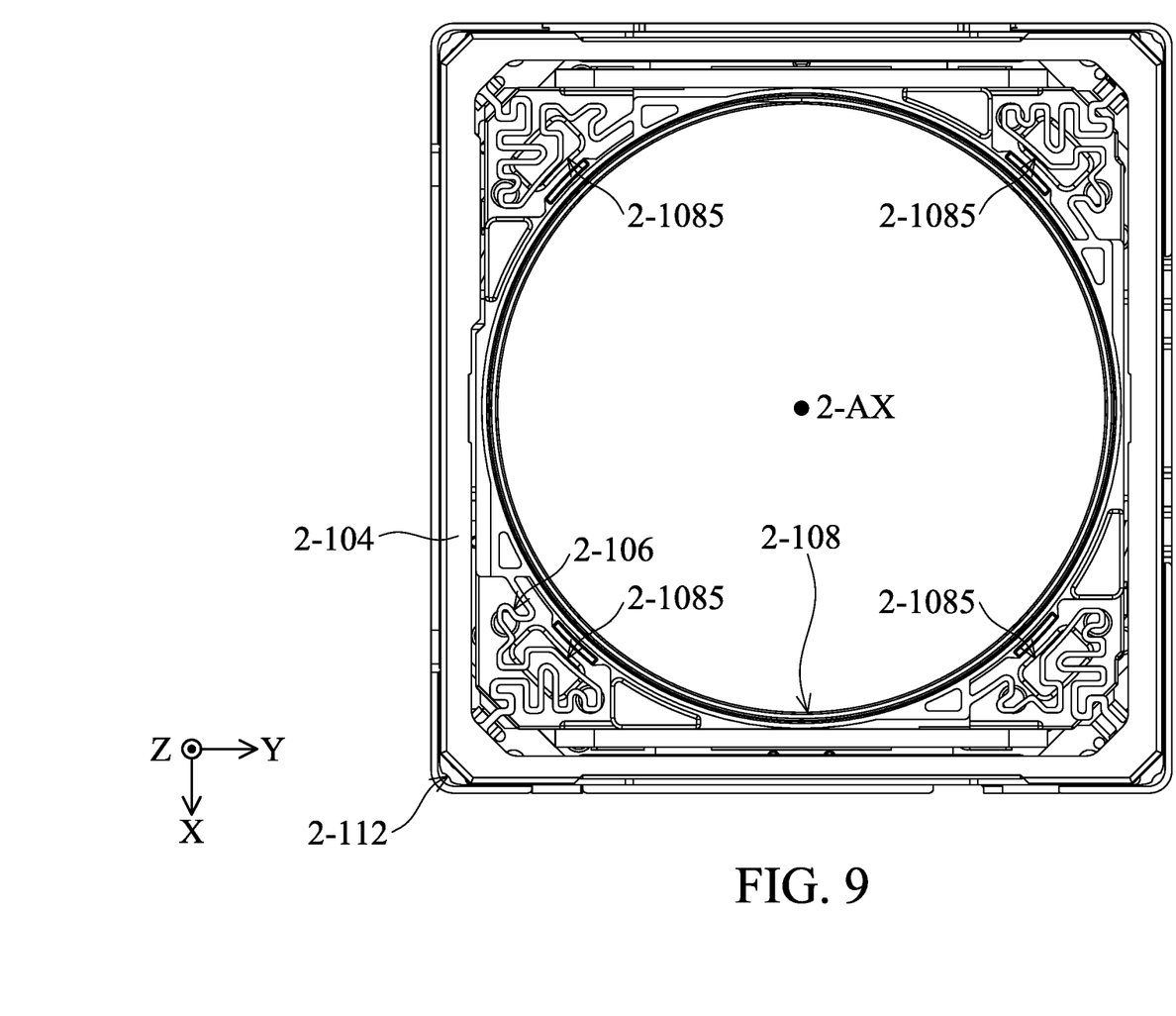
FIG. 9 is a top view of the optical element driving mechanism 2-100 after removing the casing 2-102 according to an embodiment of the present disclosure.

Please refer to FIG. 9, which is a top view of the optical element driving mechanism 2-100 after removing the casing 2-102 according to an embodiment of the present disclosure. In this embodiment, the lens holder 2-108 may include a plurality of recesses 2-1085 formed facing the base 2-112, and when viewed along the main axis 2-AX, the first elastic element 2-106 partially overlaps the recesses 2-1085. Based on the configuration of the recesses 2-1085, the weight of the optical element driving mechanism 2-100 can be further reduced.

Figure 10:
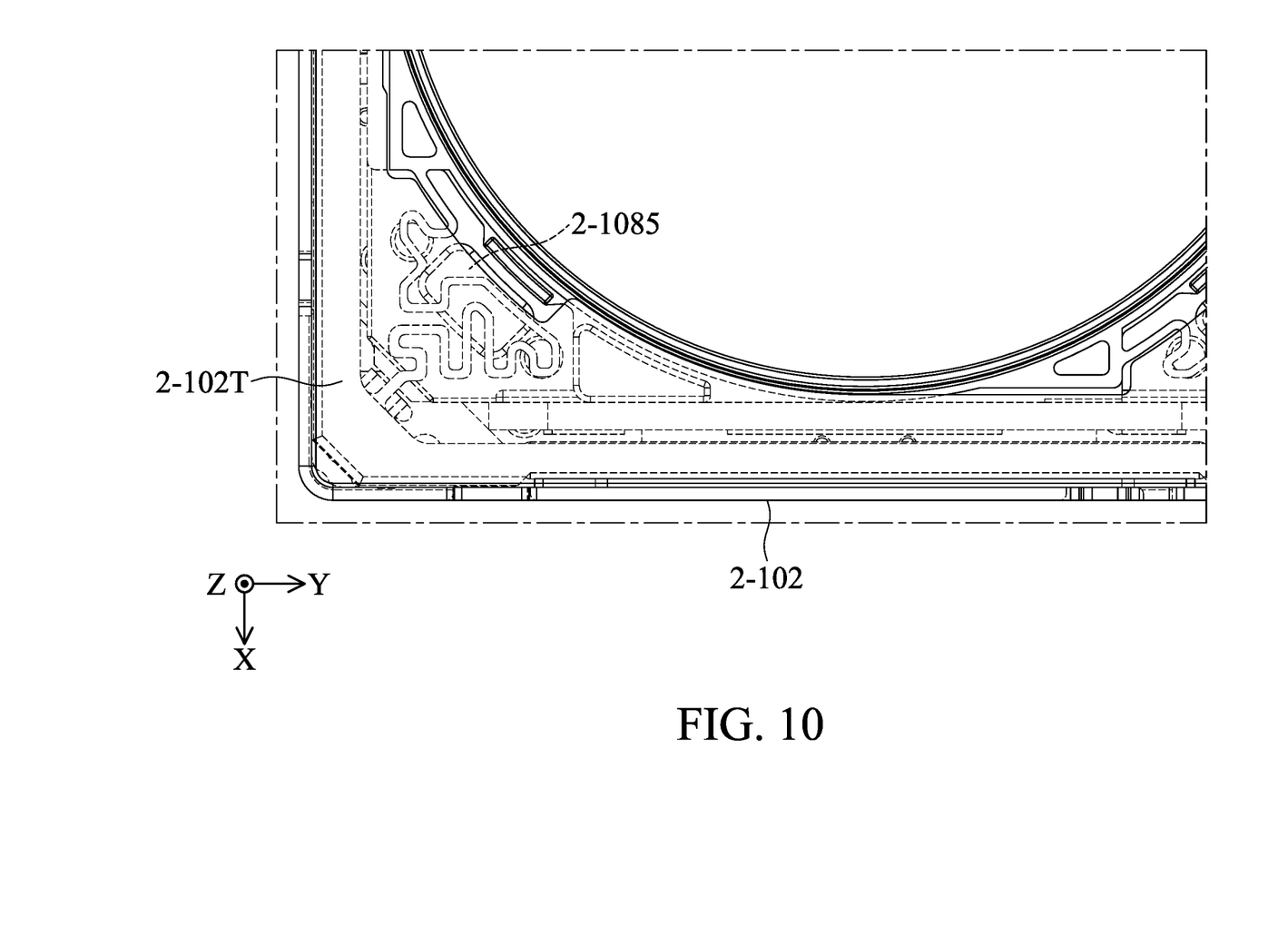
FIG. 10 is a top view of a partial structure of the optical element driving mechanism 2-100 according to an embodiment of the present disclosure.

Please refer to FIG. 10, which is a top view of a partial structure of the optical element driving mechanism 2-100 according to an embodiment of the present disclosure. In this embodiment, the casing 2-102 has a top wall 2-102T that is perpendicular to the main axis 2-AX, and when viewed along the main axis 2-AX, the top wall 2-102T completely overlaps the recess 2-1085.

The present disclosure provides an optical element driving mechanism 2-100 having a circuit assembly 2-114 and the circuit member 2-180, and the circuit member 2-180 has a plurality of electrical connection terminals 2-1801, corresponding to the plurality of electrical connection portions 2-1141 of the circuit assembly 2-114. The electrical connection terminal 2-1801 protrudes from the base 2-112. The electrical connection terminal 2-1801 may include a straight portion 2-1802 and a bent portion 2-1803, and the straight portion 2-1802 extends in the optical axis 2-O from the bent portion 2-1803.

Furthermore, the electrical connection terminal 2-1801 is electrically connected to the electrical connection portion 2-1141 by the solder 2-SD. Based on the design of the circuit member 2-180 of the present disclosure, the contact area between the solder 2-SD and the electrical connection terminal 2-1801 can be increased, thereby increasing the structural strength between the circuit member 2-180 and circuit assembly 2-114.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
   a fixed assembly, having a main axis;
   a movable assembly, configured to be connected to an optical element, wherein the movable assembly is movable relative to the fixed assembly;
   a driving assembly, configured to drive the movable assembly to move relative to the fixed assembly;
   wherein the optical element driving mechanism further includes an elastic element, the fixed assembly includes a base, the elastic element is elastically connected to the movable assembly and the fixed assembly, the movable assembly includes a recess formed facing the base, and when viewed along the main axis, the elastic element partially overlaps the recess.

2. The optical element driving mechanism as claimed in claim 1, wherein the optical element driving mechanism further includes a circuit member disposed inside the base, an electrical connection terminal of the circuit member protrudes from the base, the electrical connection terminal includes a straight portion and a bent portion, and when viewed in a direction perpendicular to the main axis, the straight portion is closer to a light-incident end of the optical element driving mechanism than the bent portion.

3. The optical element driving mechanism as claimed in claim 2, wherein the straight portion has a first surface and a second surface, the first surface is parallel to the main axis, the second surface is perpendicular to the main axis, and the first surface is made of a different material than the second surface.

4. The optical element driving mechanism as claimed in claim 3, wherein the optical element driving mechanism further includes a circuit assembly, the circuit assembly includes an electrical connection portion, and the electrical connection portion is configured to be electrically connected to the straight portion and/or the bent portion.

5. The optical element driving mechanism as claimed in claim 3, wherein when viewed along the main axis, the electrical connection portion overlaps at least one portion of the second surface of the straight portion.

6. The optical element driving mechanism as claimed in claim 3, wherein the straight portion further has a third surface and a fourth surface, when viewed along a direction perpendicular to the main axis, both the third surface and the fourth surface are parallel to the main axis, and the third surface and the fourth surface both correspond to the electrical connection portion.

7. The optical element driving mechanism as claimed in claim 3, wherein the straight portion further has a third surface and a fourth surface, when viewed along a direction perpendicular to the main axis, both the third surface and the fourth surface are parallel to the main axis, and only one of the third surface or the fourth surface corresponds to the electrical connection portion.

8. The optical element driving mechanism as claimed in claim 3, wherein the optical element driving mechanism further includes an adhesive assembly disposed between the bent portion and the electrical connection portion.

9. The optical element driving mechanism as claimed in claim 3, wherein the circuit member further includes an external electrical connection portion configured to be electrically connected to an external circuit, and the external electrical connection portion and the electrical connection terminal extend in opposite directions, wherein when viewed along the main axis, the optical element driving mechanism has a rectangular structure, and the electrical connection terminal and the external electrical connection portion are located on different sides of the optical element driving mechanism.

10. The optical element driving mechanism as claimed in claim 9, wherein the driving assembly includes a driving magnetic element configured to drive the movable assembly to move, and when viewed along the main axis, the driving magnetic element and the external electrical connection portion are located on a same side of the optical element driving mechanism.

11. The optical element driving mechanism as claimed in claim 1, wherein the movable assembly has a first convex portion and a second convex portion, the first convex portion extends in a direction perpendicular to the main axis, the second convex portion extends along the main axis, a first convex surface of the first convex portion faces a second convex surface of the second convex portion, and at least one portion of a driving coil of the driving assembly is disposed between the first convex surface and the second convex surface.

12. The optical element driving mechanism as claimed in claim 1, wherein the fixed assembly further includes a casing, the casing has a top wall that is perpendicular to the main axis, and when viewed along the main axis, the top wall completely overlaps the recess.

13. An optical element driving mechanism, comprising:
a fixed assembly, having a main axis;
a movable assembly, configured to be connected to an optical element, wherein the movable assembly is movable relative to the fixed assembly;
a driving assembly, configured to drive the movable assembly to move relative to the fixed assembly;
wherein the fixed assembly further includes a base, the optical element driving mechanism further includes a circuit member disposed inside the base, an electrical connection terminal of the circuit member protrudes from the base, the electrical connection terminal includes a straight portion and a bent portion, and when viewed in a direction perpendicular to the main axis, the straight portion is closer to a light-incident end of the optical element driving mechanism than the bent portion.

14. An optical element driving mechanism, comprising:
a fixed assembly, having a main axis;
a movable assembly, configured to be connected to an optical element, wherein the movable assembly is movable relative to the fixed assembly;
a driving assembly, configured to drive the movable assembly to move relative to the fixed assembly;
wherein the fixed assembly further includes a base, the optical element driving mechanism further includes a circuit member disposed inside the base, an electrical connection terminal of the circuit member protrudes from the base, and the electrical connection terminal includes a straight portion and a bent portion, wherein when viewed in a direction perpendicular to the main axis, the straight portion is closer to a light-exiting end of the optical element driving mechanism than the bent portion.

* * * * *